United States Patent [19]
Thompson

[11] Patent Number: 4,823,287
[45] Date of Patent: Apr. 18, 1989

[54] DIGITAL CONTOUR LINE GENERATOR

[75] Inventor: Eldon J. Thompson, Ruckersville, Va.

[73] Assignee: Honeywell Inc., Minneapolis, Minn.

[21] Appl. No.: 55,104

[22] Filed: May 28, 1987

[51] Int. Cl.⁴ .................... G06F 15/50; G06F 15/72; G01S 13/00
[52] U.S. Cl. ............................. 364/522; 364/424.01; 340/747; 340/990; 340/995; 358/103; 342/64; 342/65; 342/191
[58] Field of Search ... 364/200 MS File, 900 MS File, 364/518, 520, 522, 424; 340/727, 728, 729, 990, 995; 382/21; 358/103; 434/150, 153; 342/64, 65, 191

[56] References Cited
U.S. PATENT DOCUMENTS

| | | | |
|---|---|---|---|
| 4,179,693 | 12/1979 | Evans et al. | 342/64 |
| 4,347,511 | 8/1982 | Hofmann et al. | 342/64 |
| 4,514,733 | 4/1985 | Schmidtlein et al. | 342/64 |
| 4,660,157 | 4/1987 | Beckwith et al. | 364/522 |
| 4,706,199 | 11/1987 | Guerin | 364/460 |
| 4,729,127 | 3/1988 | Chan et al. | 382/56 |

Primary Examiner—Gary V. Harkcom
Assistant Examiner—Randy W. Lacasse
Attorney, Agent, or Firm—Arnold L. Albin

[57] ABSTRACT

A contour line generator for identifying and displaying real time elevation contour lines for use with a moving map display. A plurality of data points neighboring a selected data point are compared to determine the presence or absence of a contour line. An average elevation is computed and applied to address a contour memory, having stored therein the elevations at which contour lines are desired to be displayed. The resultant logic signals are applied dynamically to override normal display data when a contour line is to be generated. The system provides programability for flexibility in modifying contour line intervals.

10 Claims, 3 Drawing Sheets

DIGITAL CONTOUR LINE GENERATOR

BACKGROUND OF THE INVENTION

This invention was made with U.S. Government support and the U.S. Government has certain rights therein.

1. Field of the Invention

The invention relates to computer graphics displays, and more particularly to an apparatus for generating and displaying contour lines on graphics systems which display electronic maps.

2. Prior Art

Electronic map display systems which provide a map indicative of the topographical features of the terrain immediately surrounding an airborne vehicle are known to the art. See for example U.S. Pat. No. 4,484,192 filed Dec. 17, 1981 and issued Nov. 20, 1984 to William R. Seitz, et al. Of the few systems which exist dedicated solely to real time map generation, the problem of real time contour line generation with dedicated hardware has not been addressed. Software solutions to generating contour lines result in slowing down the construction rate of the moving display unless extensive memory is provided. This is a particularly significant problem where an image containing up to 256×256 pixels is updated at a rate up to 20 new images per second. Processing of such display data would have to be accomplished in under 1 microsecond per data point rate.

The present invention provides an apparatus for generating contour lines in real time for each new image display without slowing down the display construction rate. By the use of dedicated digital hardware, the system can be made programmable and will not impede the high speed flow of data within the map system with which it is associated.

SUMMARY OF THE INVENTION

According to the invention there is provided an apparatus for superposing an array of contour lines upon a moving map display including a digital memory for electronically storing elevation data, means for providing digital data signals representative of desired elevation countour lines, and means for providing digital data signals representative of a normal display of a region underlying predetermined coordinate positions of the map display. In a preferred embodiment the map data base is stored as a X-Y array of data values at integer locations from which another X-Y array of data values, corresponding to displayable pixels, is derived. Each display pixel is derived by averaging four terrain elevation values at integer locations surrounding the point under observation. An edge detector compares the values of pairs of data point signals for establishing a criterion to determine whether a contour line should appear at a point in the display. The average of four elevation data values are extracted for each desired point and combined with the edge detected signal. A contour line is generated when an edge exists and the average elevation of the four data points corresponds to a predetermined contour elevation point. A lookup table establishes the contour intervals. The table may be initialized with the desired intervals prior to usage, and may also be programable for varying the intervals in accordance with the underlying electronic map display. When a contour data point is identified, it overwrites the normal data display. A sequencer generates timing signals for synchronizing the elevation data signals and the operation of the elevation average circuit.

DESCRIPTION OF THE DRAWINGS

A preferred embodiment of the present invention is illustrated in the accompanying drawings wherein.

DESCRIPTION OF THE PREFERRED EMBODIMENT

The general principles of a contour map are well known. A contour line on a paper map is a line joining points of equal elevation. Such contour lines are generally depicted as continuous and smooth except at the boundary of the map. For a given scale, the elevation levels are defined at fixed distances, such as every 500 feet. The spacing required to provide a pleasing and useful visualization of terrain features through the use of contour lines is generally a function of the land typography. Thus, an area such as the state of Kansas, comprised of extensive flat regions, would require relatively small contour intervals. For mountainous or hilly terrain, a relatively larger spacing would be required in order to avoid obscuring the map detail by the contour lines. The contour lines used with electronic map displays are similar in function and application to those used on paper maps.

Figure 1:
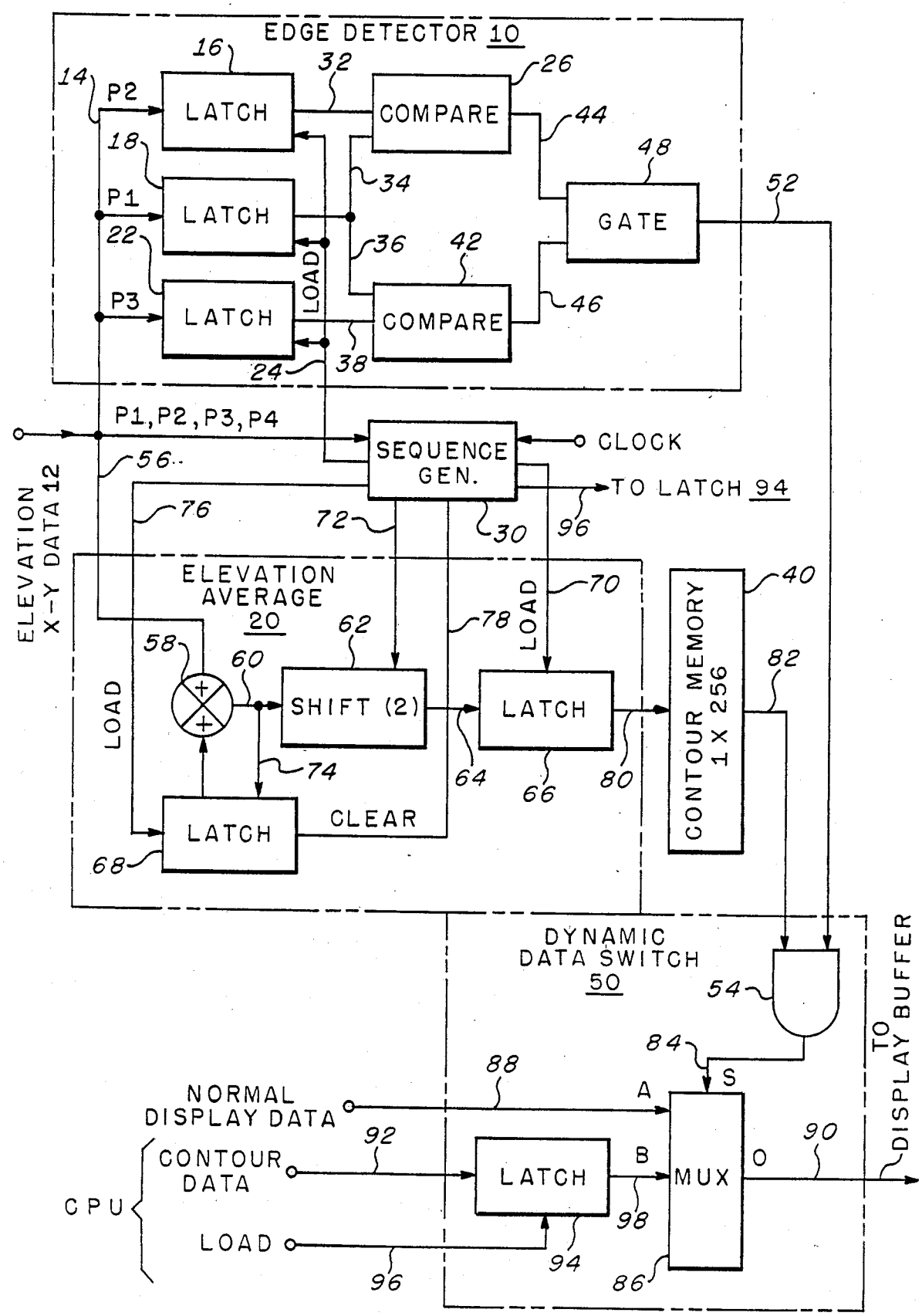
FIG. 1 is a schematic block diagram incorporating an edge detector, elevation averager, contour memory, and dynamic data switch and incorporating sources of inputs to the system logic necessary to carry out the invention.

Referring now to FIG. 1, the contour line generator is seen to be comprised of an edge detector 10, an elevation average circuit 20, a sequence generator 30, a contour memory 40, and a dynamic data switch 50. In the map display system for which the present contour generator is adapted, the map data base is stored as an X-Y array of elevations. The terrain elevation is sampled at constant predetermined intervals, which may be fixed linear distances (e.g., yards or miles) or fixed angular measurement (seconds of arc) if using a spherical earth model. Thus, the terrain may be represented as an X-Y grid wherein an elevation point is defined at each X-Y location. The data is organized in the same fashion in a memory array which provides data to the present invention. This allows direct X-Y addressing to a particular point of elevation.

Elevation X-Y data is supplied from the external memory on a bus 12 in the form of four terrain elevation values P1, P2, P3, P4. An initial data point P0 [X, Y] is loaded into the data memory, not shown. Both an X address and a Y address must by provided to define a point on the map display. While the addresses in general will have both an integer and a fractional part, the memory array contains data only at integer locations in order to minimize the required data storage. The fractional part of the P0 [X,Y] addresses is therefore truncated. The new data point which is representative of the integer location is stored in a further memory array and termed P1. The address for point P2 is created from P1 by holding Y constant and adding 1 to X. Point P3 is created from P2 by adding 1 to Y and subtracting 1 from X. Finally, point P4 is created from P3 by adding 1 to X. As these are all integer operations they may be performed at a very fast rate by simple adders or bidirectional counters. The signals P1, P2, and P3 are then provided on bus 14 to edge detector circuit 10. A new point P0' is then computed by the address generation circuit (not shown) and the above operation is repeated to get four points about the new point P0'. Because a four pixel neighborhood about the desired point is extracted, it is possible to derive useful information by analyzing the extracted data. Thus, it may be determined by comparing the values of the data points whether the surface defined by the four points is flat. It is also possible to obtain a suitable estimate of the elevation by averaging the four neighboring elevation data point values. This offers significant advatages over a system which accesses only one data point for each output point, since it is then not possible to determine surface characteristics as accurately and readily.

The edge detector 10 is comprised of latches 16, 18, and 22 which receive data points P2, P1, and P3, respectively. The latches are loaded by a signal on bus 24 from sequence generator 30. Sequence generator 30 in turn is driven in synchonism with a clock signal, which does not form a part of the present invention. The output of latches 16 and 18 is provided on buses 32 and 34 to a comparator 26, whose function will be described. Similarly, the output of latches 18 and 22 is supplied on buses 36 and 38 to comparator 42. Comparator 26 and comparator 42 provide signals on respective lines 44 and 46 to gate 48. The output of gate 48 is coupled on line 52 through a logical AND gate 54 located in dynamic data switch 50.

Referring now to the elevation average circuit 20 of FIG. 1, the derived data points P1, P2, P3, and P4 are supplied on a bus 56 to an adder 58; adder 58 provides an output on line 60 to a shift register 62 whose output is provided on line 64 to a latch 66. Latch 66 is further responsive to a timing signal from sequence generator 30 provided on line 70 for loading the latch. Shift register 62 also receives a timing signal from sequence generator 30 on line 72. The output from adder 58 is coupled on line 74 to latch 68 to form a wrap-around latch, whose function will be described below. Signals from sequence generator 30 are further provided on lines 76 and 78 to load and clear the latch, respectively.

An average elevation signal is coupled from latch 66 on line 80 to address contour memory 40. Contour memory 40 is arranged as a single bit wide by 256 word linear array to serve as an elevation contour lookup table. If random access memory is used, it can be dynamically reprogrammed to change the elevations at which contours are desired. If read only memory is used, less circuitry is required since the table does not need to be loaded. A value 1 placed at a memory location indicates that a contour line is to appear at the corresponding elevation. A value of 0 represents that no contour line is desired to appear at that elevation.

The output of contour memory 40, which represents either a logic 0 or a logic 1, is provided on line 82 to one input of AND gate 54. The output of AND gate 54 is applied on line 84 to select the A or B inputs of multiplexer 86. The A input receives the normal map display data on line 88, which is provided by multiplexer 86 on line 90 to a display buffer, not shown. Data representative of a contour line is applied on line 92 to a latch 94, and is loaded by a timing pulse on line 96 from an external central processing unit, not shown. The stored data in latch 94 is applied on line 98 to input B of multiplexer 86. The output O thereof is applied on line 90 to the display buffer.

Having described the structure of the invention, the operation of the embodiment of this invention depicted in FIGS. 1 through 5 will now be discussed.

Figure 2:
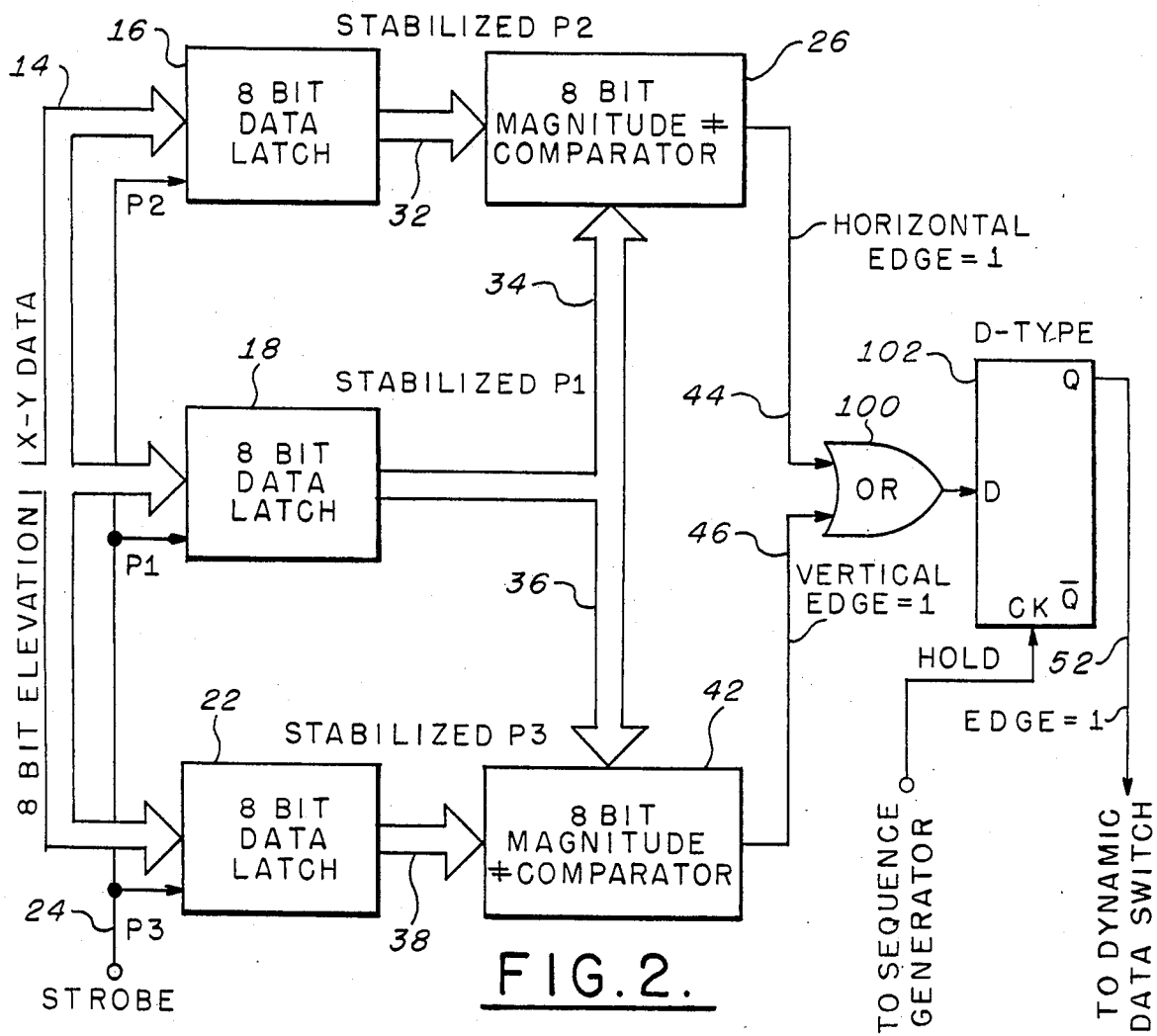
FIG. 2 is a schematic block diagram of the edge detector.

Referring now to FIG. 2, the operation of the edge detector 10 will be described. In this system, the digital terrain data is scanned out of a large memory in order to build a map image. The resultant image is an X-Y array of data values which corresponds to displayable pixels. The technique described above is used to extract the four data points P1, P2, P3, and P4 in the neighborhood of the initial address P0. As noted above, the computed data points correspond to integer locations on the X-Y display. The external addressing system performs a raster-like scan from the X-Y array of elevation data. The address created in the scan for the point P0 does not always fall on an integer location. The four nearest neighboring data values which actually occur on integer locations and hence are physical locations in memory are termed P1, P2, P3, and P4. For example, assume it is desired to display an elevation range of zero to 16,000 feet in units of feet at 64 foot minimum contour intervals. A value of 16,000 can be represented in binary form by an 8 bit word. Depending on the precision desired, greater word lengths may be provided. As the data is extracted using the four-point technique, the circuit of FIG. 2 determines whether a contour line should appear at a predetermined point in the display of the electronic map. A set of criteria is defined to determine if a contour exists by using only the points P1 through P4. A contour line is generated if either a horizontal or vertical "edge" exists and the average elevation of the four data points coincides with a predetermined contour elevation line, which is tested by the elevation average circuit of FIG. 3.

A horizontal edge is defined to exist when the elevation data value at P1 is not equal to the elevation data value of P2. A vertical edge is defined to exist when the elevation value of P1 is not equal to the data value of P3. It is sufficient to examine the pairs of values P1, P2 and P1, P3 for the edges; P4 is not required. As shown in FIG. 2, in which like reference numbers correspond to like elements of FIG. 1, three hold latches 16, 18, and 22 are employed. The point values P1, P2, P3 and P4 are extracted sequentially over data bus 14 and applied to the corresponding data latches. When P1 data is present, a strobe signal 24 provided by the sequence generator 30 stores the 8 bit data value into the latch 16. P2 and P3 are similarly stored in latches 18 and 22. Latching the data stabilizes it so that the edge detector can perform the required comparisons. Note that P4 is not required and hence is not stored in this circuit. The stabilized P1, P2 and P3 data values are applied by the data latches 16, 18, and 22 to 8 bit magnitude comparators 26 and 42. The comparators provide a signal output which is a logical one if the two compared values are not equal and a logical zero if they are equal. Comparator 26 identifies horizontal edges and comparator 42 vertical edges. The corresponding outputs are applied on lines 44 and 46 to a logical OR gate 100. OR gate 100 combines the two edge signals to generate an output signal which occurs any time either a horizontal or vertical edge is determined to exist. The output of gate 100 is stored in D-type flip-flop 102, which is clocked by sequence generator 30, and read out on line 52 in a conventional manner.

Figure 3:
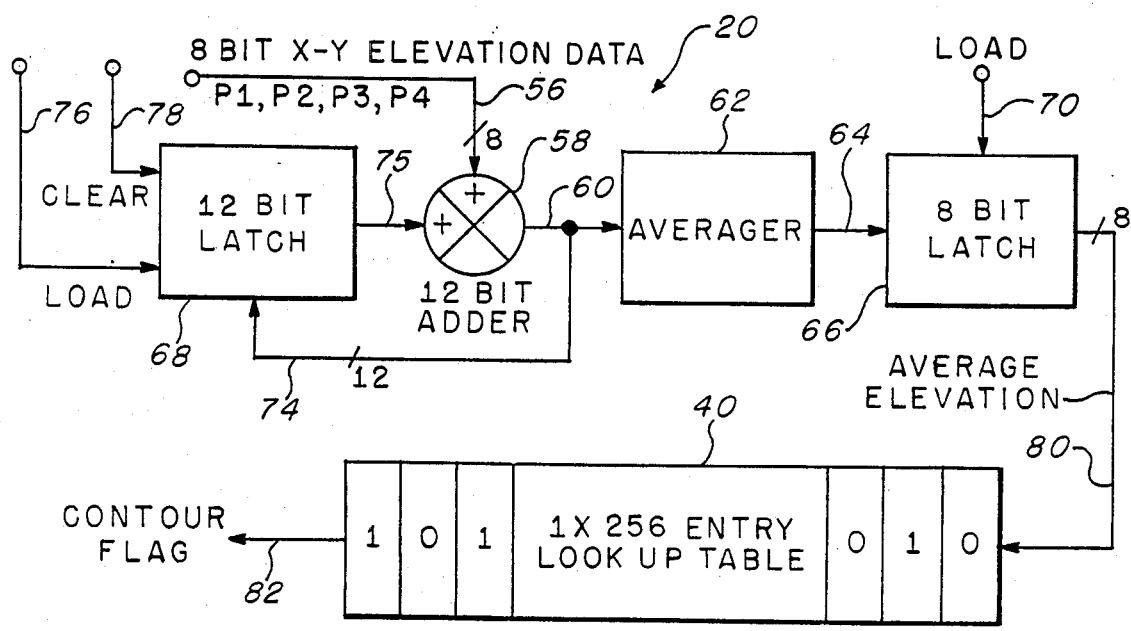
FIG. 3 is a schematic block diagram of the elevation data averager.

Referring now to FIG. 3, the elevation average circuit 20 will be described. The elevation average circuit provides an average of the four data point values P1, P2, P3, and P4. This average is simply the sum of the four values of the elevation divided by four. Before data point P1 is retrieved, latch 68 is cleared and initialized to zero. As the elevation values are retrieved from the memory, the adder 58 sums the new value to the previous sum. For example, data point P1 is provided on 8 bit data bus 56 and added to the value of zero stored in latch 68 to result in a sum of P1. The output of adder 58 is supplied to averager 62 and on bus 74 to latch 68 where it is stored and applied on bus 75 to a second input of adder 58. Data point P2 is then time sequentially supplied to the first input of adder 58 and is added to the value of P1 stored in latch 68. The output P1+P2 appears on bus 74 and is stored back into latch 68. Data points P3 and P4 are then sequentially added to arrive at a final sum of P1+P2+P3+P4. To complete the average computation, the sum on bus 60 must be divided by four. This may be accomplished by an average circuit in the form of a shift register since it merely requires a right shift two places. However, a physical shifter component is not required since it is only necessary to use the appropriate signal lines from the adder circuit. For example, an elevation value of 128 feet is represented in binary by 10000000. By shifting the output two places to the right, the resultant binary signal is 00100000, for a value of 32. Thus it is merely necessary to omit the two most significant bits from bus 60. This resultant is applied on bus 64 to an 8 bit latch 66. It should be noted that the adder 58 must be capable of adding four 8 bit numbers which would require a 10 bit adder. It is implemented here in the form of a 12 bit adder, since a practical add function is usually 4 bits per integrated circuit.

After being loaded into 8 bit latch 66 by the timing signal on line 70, the average elevation value is applied on bus 80 to a contour memory 40, comprised of 1×256 entry lookup table. For contour intervals of 64 feet, and an elevation range of 16,000 feet, there are required 256 storage locations, where each address in the lookup table then represents a specific elevation at successive locations representing increments of 64 feet. If the map scale is such that intervals of 128 feet of elevation are suitable, the lookup table may be programed with alternate 0 and 1 values in successive storage locations. A value of 0 results in no contour line display, while a value of 1 results in a contour line display at the desired interval of 128 feet. Thus, a one bit word is sufficient. By using a larger storage word, for example 4 bits, up to four contour intervals may be stored and accessed by addressing the corresponding bit sequence. Alternatively, the lookup table may be comprised of RAM and a new table dynamically loaded in the memory as needed. Thus, the location addressed by bus 80 will provide a readout on bus 82 representative of the presence or absence of a contour line.

Referring again to FIG. 1, dynamic data switch 50 is used to insert a contour data line overlaying the normal map display when both the edge detector and the contour memory indicate the presence of a contour line. If both conditions are true, the circuit 50 will flag the predetermined X-Y location as a contour line data point. This signal is used to interrupt the normal flow of display data on its way to the display buffer. The logic signals from gate 48 of edge detector 10 are applied on line 52 to one input of AND gate 54. The contour signal from memory 40 is applied on line 82 to a second input of AND gate 54. The output of gate 54 is applied on line 84 to control multiplexer 86. When either the signal on line 52 or line 82 is absent, there will be no output signal on line 84, and the normal display data signals on bus 88 will be applied to input A of multiplexer 86. A corresponding output will appear on bus 90 and be coupled to the display buffer. During the scanning of the X-Y memory, contour data is presented on bus 92 to latch 94, which is loaded by a timing signal on line 96 from sequence generator 30. The output of latch 94 is applied on bus 98 to the B input of multiplexer 86. When activated by a signal on line 84 from AND gate 54, denoting the presence of both a detected edge and a contour signal from memory 40, the contour signal on line 84 will switch multiplexer 86 so that the normal display data in interrupted and the signal on bus 98 is transferred to the output bus 90. Thus, the contour signal 84 is toggled as contours are identified and the contour lines will overwrite the normal display data.

Figure 4:
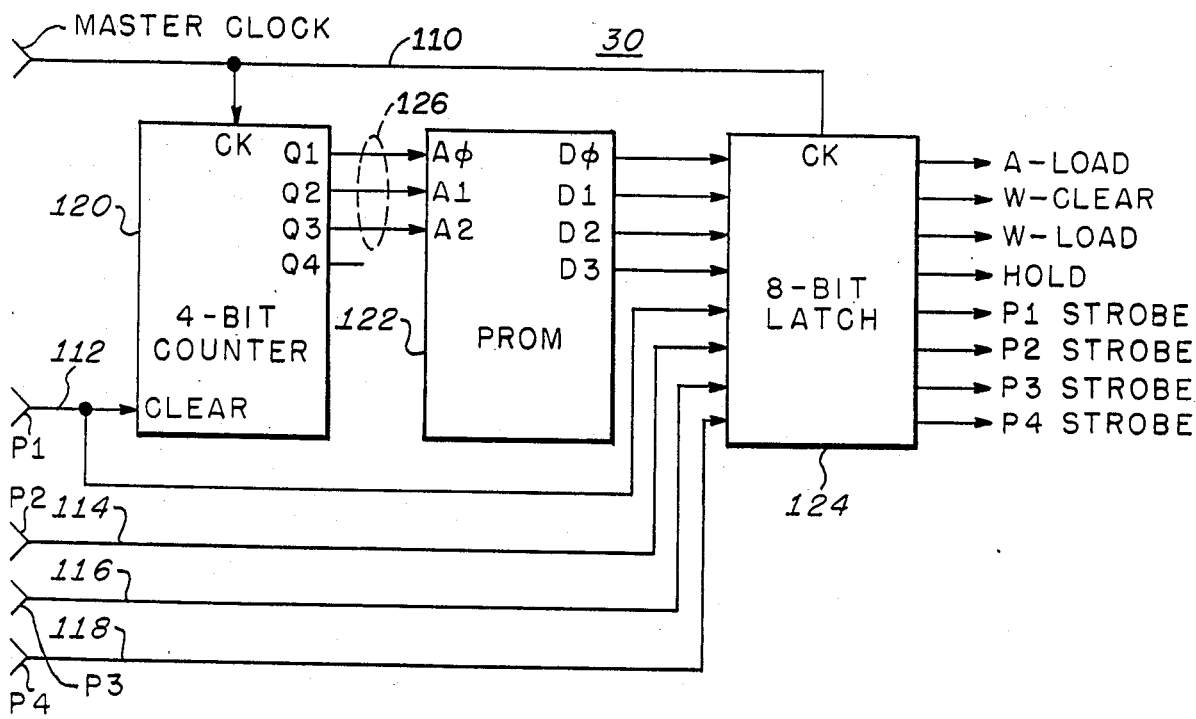
FIG. 4 is a block diagram of the sequencer used for generating timing signals.

FIG. 4 is diagram of the sequence generator 30 which may be used for the generation of control signals. This circuit is a typical digital state controller and could be constructed in alternative configurations. A master clock signal at a rate of about 25 MHz is applied on line 110 to the clock inputs of a 4 bit counter 120 and an 8 bit latch 124. Counter 120 is used to address a PROM 122 which decodes the time states corresponding to the clock pulses. Thus, at each successive clock pulse, counter 120 is incremented to provide a total of 8 states. A transition of data point P1 causes counter 120 to clear and returns the count to 0. Signal P1 occurs again after 8 master clock cycles, hence the counter increments from 0 to 7, providing a total of 8 discrete states. These outputs are used as addresses on the address bus 126 to PROM 122. At each addressable storage location in PROM 122 a digital value is programmed to to create a corresponding waveform as shown at the outputs of latch 124. Latch 124 merely holds the waveforms stable until a new value is transmitted from PROM 122.

Figure 5:
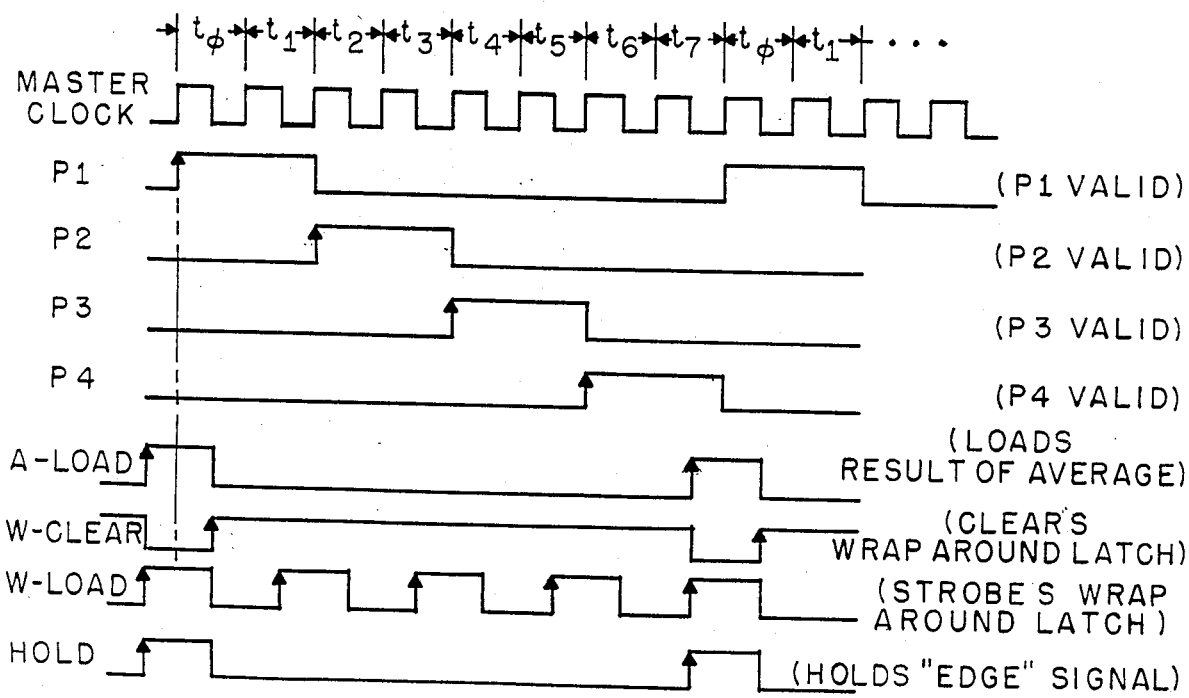
FIG. 5 shows waveforms and their timing relationship as generated by the sequencer of FIG. 4.

The waveforms generated by the circuit of FIG. 4 are shown in FIG. 5. The external master clock signal is seen to be a periodic waveform comprised of eight intervals t0 through t7. Data signal P1 occupies two clock pulses and repeats after eight clock cycles. Data points P2, P3 and P4 are seen to follow data point P1 sequentially and the cycle repeats after eight master clock cycles. The waveforms identified at the output bus of latch 124 are seen to be A-load, which loads the result of the average elevation circuit; W-clear, which clears wrap-around latch circuit 68; W-load, which strobes wrap-around latch 68; and the hold pulse, which holds the edge signal for application to dynamic data switch 50.

It may be seen that the novel circuits described herein allow the system to identify and display all data points corresponding to pixels in an elevation contour with minimal circuit complexity. The present invention provides identification and display of an image 256 pixels by 256 pixels in 1/20th of a second. Since the data is processed at the normal operation rate and in parallel with normal data flow, it is not necessary to delay the processing of the normal map display data in order to provide the contour analysis. The circuits provide real time contour line generation and allow programability for maximum flexibility.

While the invention has been described in its preferred embodiments, it is to be understood that the words which have been used are words of description rather than limitation and that changes may be made within the perview of the appended claims without departing from the true scope and spirit of the invention in its broader aspects.

Embodiments of an invention in which an exclusive property or right is claimed are defined as follows:

1. A contour line generator for overlaying an electronic map display and for defining topological features at predetermined intervals along a region of said map display, wherein said map display includes memory means for electronically storing digital elevation data representative of deviations from a predetermined plane of elevation at integral X and Y coordinate positions, means for providing digital data signals indicative of desired elevation contour lines, sequencer means responsive to a source of clock pulses for generating a plurality of timing control signals, and means for providing digital data signals indicative of a normal display of a region underlying said X and Y coordinate positions, said contour line generator comprising:

edge detector means for sequentially receiving a plurality of digital elevation data point signals P1, P2, P3 from said memory means corresponding to addresses $(X_i, Y_i)$, $(X_i+1, Y_i)$, $(X_i, Y_i+1)$;

means for comparing values of pairs of said plurality of data point signals and providing a first logic signal when one of said pairs has equal values and a second logic signal when said one pair has nonequal values;

elevation averaging means for sequentially receiving said data point signals P1, P2, P3 and a further elevation data point signal P4 corresponding to an address $(X_{i+1}, Y_{i+1})$ from said memory means for providing a quotient signal corresponding to an average of said data point signals, said data point signals P1, P2, P3, P4 corresponding to predetermined integral X and Y coordinate positions representative of a plurality of displayable pixels on said map display surrounding a computed elevation data point signal P0 corresponding to said average value, said signal P0 comprising a fractional interval of said integral X and Y coordinate positions;

said sequencer means responsive to said sequential elevation data point signals P1, P2, P3, P4, and coupled to energize said elevation averaging means in synchronism with said clock pulses;

contour lookup memory means responsive to said quotient signal for defining said predetermined intervals and for providing a first logic signal when it is desired to display a contour line on said map display at an elevation corresponding to said average value and a second logic signal when a contour line display is to be inhibited, said lookup memory means comprising a plurality of addressable digital storage locations, wherein each of said storage locations stores at least one bit of digital data defining the presence or absence of a contour line location and each said storage location has a corresponding address, said average value corresponding to one of said addresses; and display logic switch means for preferentially displaying a contour line on said display map when said average value coincides with a storage location defining a contour line and at least two of said plurality of elevation data points are of unequal values, said display logic means coupled to receive said first or second logic signals from said edge detector means and contour data signals from said contour lookup memory means corresponding to said addressed storage locations, said switch means comprising AND logic gate means for combining a signal corresponding to said at least one stored bit of digital contour data and said first or second logic signals from said edge detector means, and further comprising switch means responsive to said data signals indicative of desired elevation contour lines and said data signals indicative of a normal display, for selectively energizing said map display in accordance therewith.

2. A contour line generator as set forth in claim 1, wherein said edge detector means comprises:

first latch means responsive to said elevation data point signals P1, P2, P3, for sequentially storing said signals when energized by said sequencer means coincident with ones of said data point signals;

first comparator means for comparing values of said P1 and P2 signals and for providing a logic zero output when said first compared values are equal and a logical one if said compared values are unequal;

second comparator means for further comparing values of said P1 and P3 signals and for providing a logic zero output when said further compared values are equal and a logical one if said further compared values are unequal; and logic gate means for receiving said logic outputs of said first and second comparator means and for providing a logic one output when either of said first and second comparators provides a logic one output and for providing a logic zero output when both of said first and second comparators provide a logic zero output, thereby defining a detected edge condition corresponding to said logic one output of said first or second comparator means.

3. A contour line generator as set forth in claim 2, wherein said elevation averaging means comprises:

summing junction means having a first input responsive to said sequential elevation data point signals P1, P2, P3, P4 and a second input for receiving output signals in closed loop fashion derived from said summing junctions means, for providing an output signal representative of a sum thereof;

divider means for receiving said sum signal and providing said quotient signal corresponding to an average of said sum signal with respect to said data point signals;

second latch means responsive to said derived output signals and to said timing signals derived from said sequencer means, for providing a sum of values of said P1, P2, P3, P4 data point signals to said second input of said summing junction means; and third latch means responsive to said sequencer means and said quotient signal for storing said quotient signal and providing an address signal corresponding thereto to said contour lookup memory means.

4. A contour line generator as set forth in claim 3, wherein said contour lookup memory further comprises a digital read only memory.

5. A contour line generator as set forth in claim 3, wherein said contour lookup memory means further comprises a digital random access memory.

6. A contour line generator as set forth in claim 3, wherein said display logic switch means further comprises:

multiplexer switch means having a first input for receiving said normal display data signals and a second input for receiving said signals indicative of desired contour lines;

AND logic gate means having a first input coupled to receive said logic signals from said contour memory means and a second input coupled to receive said logic signals from said edge detector means, for providing a control signal representative of a desired contour line at a predetermined elevation to said multiplexer means; and fourth latch means responsive to said signals indicative of desired contour lines and to a further source of timing signals cooperating with said means for providing signals indicative of desired contour lines, for periodically storing and providing said contour line signals to said second input of said multiplexer means;

said multiplexer means responsive to said control signal for selecting one of said signals applied to said first and second inputs in accordance with ones of said addressed storage locations in said lookup table memory means.

7. A contour line generator as set forth in claim 6, wherein said X and Y coordinate positions comprise a rectangular coordinate system.

8. A contour line generator as set forth in claim 6, wherein said X and Y coordinate positions are linearly displaced.

9. A contour line generator as set forth in claim 6 wherein said X and Y coordinate positions are angularly displaced.

10. A contour line generator for displaying topological features on a moving electronic map display comprising:

means for providing digital data signals representative of a plurality of elevations neighboring a preselected location on said map display;

means for comparing pairs of said digital data signals and for providing an output signal when one of said pairs corresponds to unequal values of said elevations;

means for providing an average of said digital data signals;

data storage means having a plurality of addressable storage locations indicative of predetermined contour line intervals and responsive to said average of said digital data signals for providing an output signal corresponding to the presence of a desired contour line location at said preselected location; and switch means responsive to a source of normal terrain data representative of said moving map display, to a source of contour line data, and to a coincidence of said output signals from said means for comparing and said storage means, for enabling a display of said contour line data at said preselected location.

* * * * *